UNITED STATES PATENT OFFICE.

ARCHIBALD K. LEE, OF PHILADELPHIA, PENNSYLVANIA.

COMPOUND FOR ARTIFICIAL STONE.

SPECIFICATION forming part of Letters Patent No. 225,991, dated March 30, 1880.

Application filed September 3, 1879.

*To all whom it may concern:*

Be it known that I, ARCHIBALD K. LEE, of the city and county of Philadelphia, in the State of Pennsylvania, have invented a certain new and useful Compound for Artificial Stone, of which the following is a specification.

My invention relates to an improvement in the formation or manufacture of artificial stone to be used in the construction of sea-walls, docks, pavements, cellar-floors, walls, cisterns, aqueducts, railroad-depot platforms, stucco-work, (to be used upon external or internal walls,) and well adapted for molding into friezes, entablatures, vases, statues, and other ornamental forms.

The prime object of my invention is to dispense with the use of Portland, Roman, Rosendale, and other hydraulic cements in the manufacture of artificial stone, which are now commonly used, and to substitute therefor certain earthy, calcareous, mineral, and bituminous substances, hereinafter more fully specified, which substitution materially reduces the cost of the articles manufactured, and at the same time better and more durable articles are produced.

The formula for the production of this artificial stone, and which is an improvement on United States Patent No. 188,645, granted to me March 20, 1877, is as follows: twenty-five bushels of coarse sand; ten bushels of powdered rock, preferably limestone; ten bushels of pulverized iron-slag; ten bushels of plaster-of-paris; twenty bushels of baked clay, preferably sulphate of alumina; ten bushels of silica; one thousand two hundred and fifty pounds of lime; one hundred pounds of oxide of iron; fifteen pounds of litharge or gray oxide of lead; twenty-five pounds of oxide of manganese; fifteen pounds of powdered glass.

All of the above-named ingredients must be reduced to a fine powder, thoroughly mixed or incorporated in a suitable machine or mixer, and calcined or heated to expel carbonic acid and moisture. When cold, being in the condition of fine powder, it may be put into packages for shipment, or stored until wanted for use.

When designed to be used for ornamental purposes, and a gray color is desired, it is simply mixed to a plastic condition by the addition of water, or pigments of any desired color may be incorporated, and the plastic mass molded or worked in any manner into the desired form.

If the compound is to be used as a stucco the walls to which it is to be attached or applied must be first washed or coated with a vegetable oil, and the compound (prepared as above described) applied while in a plastic state.

Being wholly composed of ingredients or materials within common reach in all sections of the country, and the use of the costly cements dispensed with, my compound specially recommends itself for general use.

When a pavement, sea-wall, or other like structure is to be constructed, and a dark color not objectionable, I mix the above compound to a plastic state by introducing twenty per centum of asphaltum with the powdered mixture. For this purpose I prefer to use asphaltum which has been liquefied without heat—as, for example, that described in my United States Patent No. 162,394, dated April 20, 1875—for the better incorporating and intermingling of the materials; but I do not confine myself thereto. I heat the asphaltum and the dry powdered mixture, and thoroughly incorporate them into a homogeneous mass. They are then ready to be spread in mass or molded into blocks.

This compound is specially adapted for pavements, sea-walls, &c., because it sets or hardens very quickly, is impervious to moisture, forms a perfect asphalted concrete, and is practically indestructible.

In constructing pavements, roadways, garden-walks, &c., this asphalted concrete is applicable for surfacing any properly-prepared concrete base, the thickness of the base being constructed to suit the intended purpose.

When this asphalted concrete is to be molded it should be turned into the molds as soon as thoroughly mixed and while still warm, and then well tamped and the surfaces smoothed off without delay.

Having thus described my invention, what I claim, and desire to secure by Letters Patent, is—

A compound consisting of sand, powdered rock, pulverized iron-slag, plaster-of-paris, baked clay, silica, lime, oxide of iron, litharge, oxide of manganese, and powdered glass, or their equivalents, in substantially the proportions as set forth, and with or without asphaltum, compounded in the manner substantially as set forth, and for the purposes hereinbefore specified.

ARCHIBALD K. LEE.

Witnesses:
JAMES ADAIR,
JOHN HEINS,
FRANK T. WEBB.